US012630120B2

(12) United States Patent
Han

(10) Patent No.: US 12,630,120 B2
(45) Date of Patent: May 19, 2026

(54) SENSOR CLEANING SYSTEM WITH ANTI-FREEZING FUNCTION

(71) Applicants:HYUNDAI MOTOR COMPANY, Seoul (KR); KIA CORPORATION, Seoul (KR)

(72) Inventor: Yu Ri Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 748 days.

(21) Appl. No.: 17/985,625

(22) Filed: Nov. 11, 2022

(65) Prior Publication Data

US 2023/0174023 A1 Jun. 8, 2023

(30) Foreign Application Priority Data

Dec. 2, 2021 (KR) ........................ 10-2021-0171087

(51) Int. Cl.
B60S 1/54 (2006.01)
B60S 1/02 (2006.01)
H05B 1/02 (2006.01)

(52) U.S. Cl.
CPC ................. B60S 1/54 (2013.01); B60S 1/023 (2013.01); H05B 1/0244 (2013.01)

(58) Field of Classification Search
CPC ........... H05B 1/0244; B60S 1/023; B60S 1/54
USPC ........................................................... 15/313
See application file for complete search history.

(56) References Cited

U.S. PATENT DOCUMENTS

| | | | | |
|---|---|---|---|---|
| 9,375,737 | B1 * | 6/2016 | Zucker ................. | B05B 7/1666 |
| 11,273,798 | B2 | 3/2022 | Giraud | |
| 2007/0077151 | A1 * | 4/2007 | Hirasawa .............. | F04B 49/022 |
| | | | | 417/5 |
| 2014/0104426 | A1 * | 4/2014 | Boegel .................... | B60R 11/04 |
| | | | | 348/148 |
| 2018/0304863 | A1 * | 10/2018 | Picot ........................ | B60S 1/56 |
| 2019/0106086 | A1 | 4/2019 | Giraud | |
| 2020/0346624 | A1 * | 11/2020 | Kahlund ................. | B60S 1/548 |
| 2021/0243913 | A1 * | 8/2021 | Zheng .................... | H05K 7/202 |

FOREIGN PATENT DOCUMENTS

KR 20180136981 A 12/2018

* cited by examiner

*Primary Examiner* — Katina N. Henson
(74) *Attorney, Agent, or Firm* — Lempia Summerfield Katz LLC

(57) ABSTRACT

A sensor cleaning system has anti-freezing and thawing functions in an air-jet sensor cleaning system. The sensor cleaning system includes a distributor having a channel into which compressed air is introduced and having a plurality of exits. The distributor is configured to distribute the compressed air from the channel to each of the exits. A valve of the system is formed integrally with the distributor and is capable of being opened or closed to allow or prevent supply of the compressed air through each of the exits. A heating element of the system is configured to apply heat to the distributor and a controller is configured to operate the heating element when a preset condition is satisfied.

13 Claims, 15 Drawing Sheets

Figure 15B:
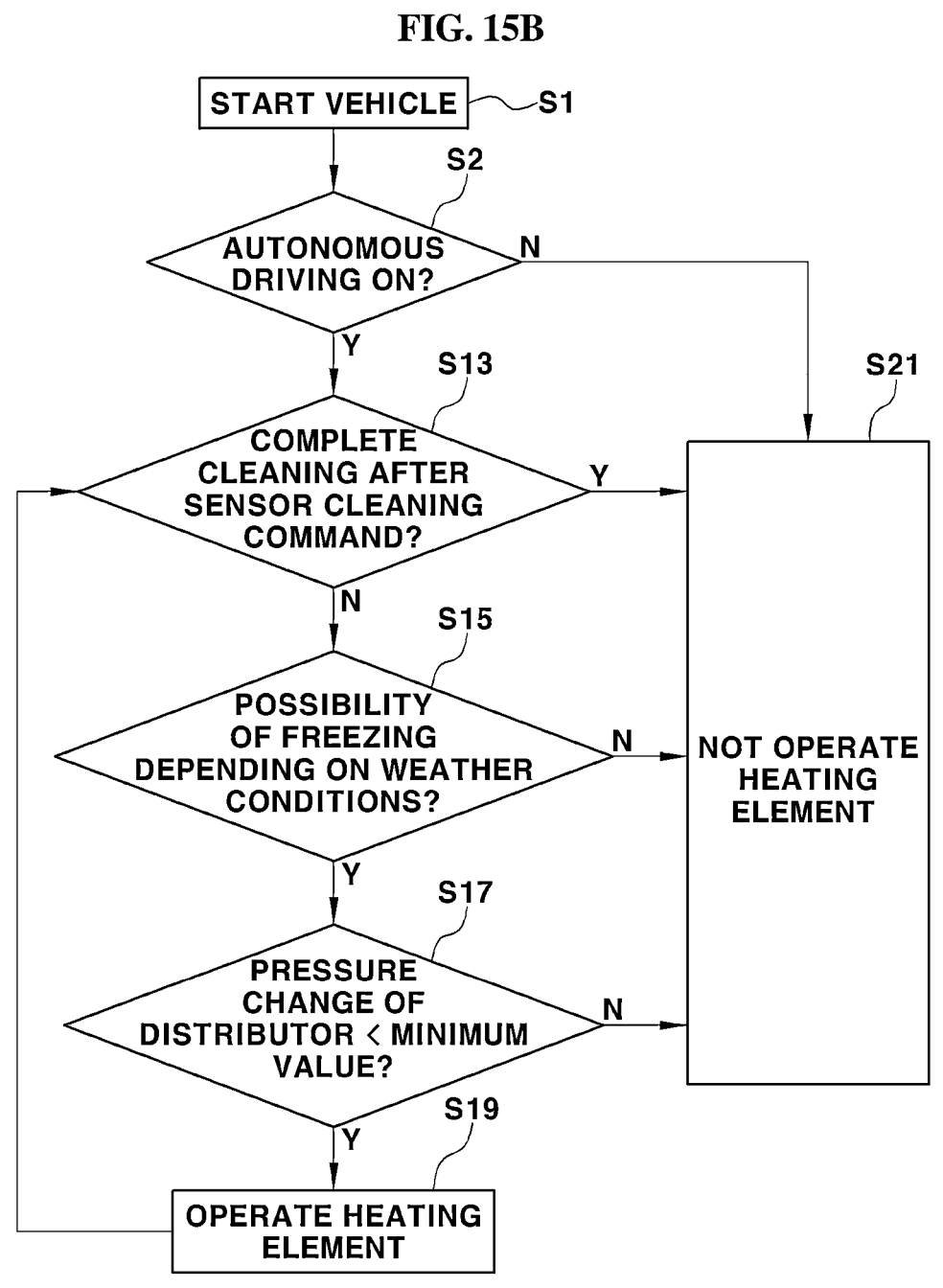

START VEHICLE — S1

S2

AUTONOMOUS DRIVING ON?  — N

S13

COMPLETE CLEANING AFTER SENSOR CLEANING COMMAND? — Y

N

S15

POSSIBILITY OF FREEZING DEPENDING ON WEATHER CONDITIONS? — N

Y

S17

PRESSURE CHANGE OF DISTRIBUTOR < MINIMUM VALUE? — N

Y

S19

OPERATE HEATING ELEMENT

S21

NOT OPERATE HEATING ELEMENT

SENSOR CLEANING SYSTEM WITH ANTI-FREEZING FUNCTION

CROSS REFERENCE TO RELATED APPLICATION

The present application claims priority to Korean Patent Application No. 10-2021-0171087, filed Dec. 2, 2021, the entire contents of which are incorporated herein for all purposes by this reference.

BACKGROUND OF THE DISCLOSURE

Technical Field

The present disclosure relates to a sensor cleaning system for a vehicle. More particularly, the present disclosure relates to a sensor cleaning system having anti-freezing and thawing functions in an air-jet sensor cleaning system.

Description of the Related Art

Recently, vehicles are equipped with a driver assistance system that assists a driver of a vehicle to secure or ensure safe operation in various driving situations. In addition to the driver assistance system, research and development are being actively conducted on autonomous vehicles in which the vehicle may drive itself without driver intervention.

In such a driver assistance system or autonomous vehicle, various types of environmental sensors are installed on the vehicle that may detect the surrounding environment of the vehicle in various ways. Examples of the environmental sensors installed on such vehicles may include a radar, a lidar, a camera, and the like.

Since these sensors are mounted on the outside of the vehicle, a sensing area may easily become dirtied or contaminated by foreign substances such as dust, rain, or snow. Since the cleanliness of these sensors should be kept at a certain level to maintain the performance or functionality of the sensor, the vehicle is equipped with the sensor cleaning system that may clean the sensor when the sensing area is contaminated.

SUMMARY OF THE DISCLOSURE

Accordingly, the present disclosure has been made keeping in mind the above problems occurring in the related art. An objective of the present disclosure is to provide a sensor cleaning system that can prevent failure due to freezing.

The present disclosure is not limited to the above-mentioned objective. Other objectives of the present disclosure may be evidently understood from the following description and may be realized by the means described in the claims and combinations thereof.

In order to achieve the objectives of the present disclosure, the present disclosure provides a sensor cleaning system for a vehicle. The sensor cleaning system includes a distributor having a channel into which compressed air is introduced and having a plurality of exits. The distributor is configured to distribute the compressed air from the channel to each of the exits. The sensor cleaning system also includes a valve formed integrally with the distributor and capable of being opened or closed to allow or prevent supply of the compressed air through each of the exits. The sensor cleaning system also includes a heating element configured to apply heat to the distributor and a controller configured to operate the heating element when a preset condition is satisfied.

According to the present disclosure, a sensor cleaning system can prevent failure due to freezing.

The effects of the present disclosure are not limited to those described above. Other effects should be clearly recognized by those of ordinary skill in the art from the following description.

BRIEF DESCRIPTION OF THE DRAWINGS

The above and other objectives, features, and advantages of the present disclosure should be more clearly understood from the following detailed description when taken conjointly with the accompanying drawings, in which:

FIG. 10 is a diagram illustrating a valve and a distributor according to some embodiments of the present disclosure;

DETAILED DESCRIPTION OF THE DISCLOSURE

Figure 1:
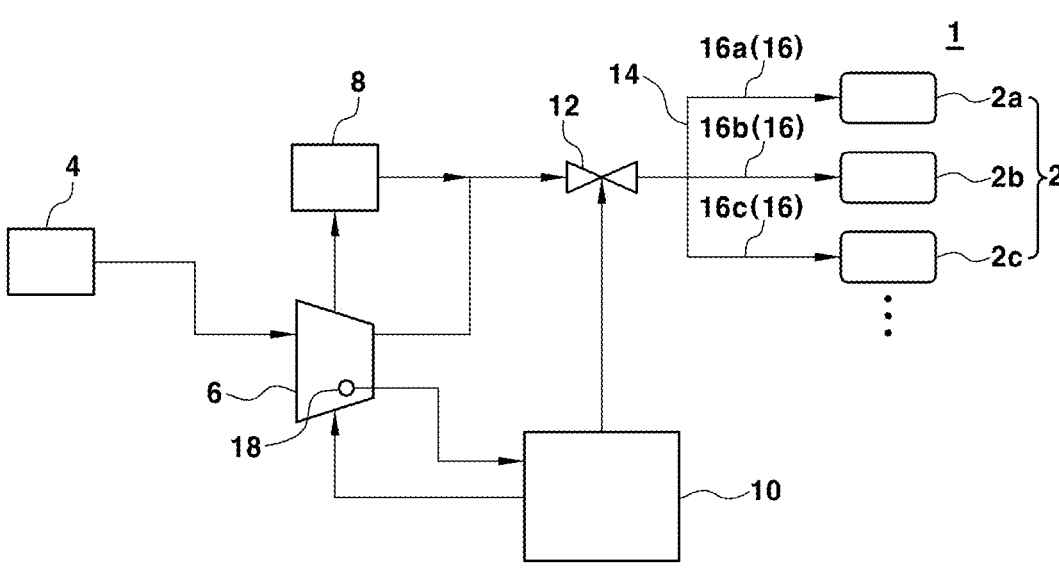
FIG. 1 is a diagram illustrating a configuration of an air cleaning system for cleaning sensors.

Specific structural or functional descriptions set forth in the embodiments of the present disclosure are only for description of the embodiments of the present disclosure. Embodiments according to the concept of the present disclosure may be embodied in many different forms. The present disclosure should not be construed as being limited to only the embodiments set forth herein, but should be construed as covering modifications, equivalents or alternatives falling within ideas and technical scopes of the present disclosure.

It should be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

Like reference numerals refer to like parts throughout various figures and embodiments of the present disclosure. The terminology used herein is for the purpose of describing particular embodiments only and is not intended to be limiting. In the present disclosure, the singular forms are intended to include the plural forms as well, unless the context clearly indicates otherwise. It should be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof. When a component, device, element, or the like of the present disclosure is described as having a purpose or performing an operation, function, or the like, the component, device, or element should be considered herein as being "configured to" meet that purpose or perform that operation or function.

Hereinafter, the present disclosure is described in detail with reference to the accompanying drawings.

As described above, in order to maintain the performance or functionality of environmental sensors that sense the surrounding environment of the vehicle, periodic cleaning of a sensor surface is required. For example, the environmental sensors may be contaminated by foreign substances, such as dust and sand, and may be contaminated by raindrops or snow during precipitation. Particularly, in an active autonomous vehicle, the vehicle is driven based on information about the surrounding environment, such as traffic lights, pedestrians, road types, buildings, and surrounding vehicles, recognized by environmental sensors. If the surface of the environmental sensor is contaminated by a foreign substance, recognition of the surrounding environment becomes difficult or impossible and active autonomous driving likewise becomes difficult or impossible. Thus, a sensor cleaning system performs an important function that enables driving by helping the environmental sensors to have clear detection of the surrounding environment without distortion and removing contaminants on the sensor surface.

The environmental sensor may be cleaned using a washer fluid and/or using high-pressure air. In the former, the sensor is cleaned using the washer fluid, and water on the sensor is removed using an air jet. In the latter, only high-pressure air is sprayed to remove foreign substances from the sensor surface.

The latter case in which the environmental sensor is cleaned using an air jet is described with reference to FIG. 1. Among the sensor cleaning systems, an air cleaning system 1 is configured to clean the environmental sensor using compressed air. The air cleaning system 1 performs cleaning by spraying compressed air on the surface of the environmental sensor 2. The environmental sensor 2 includes a sensing device, such as a lidar, a radar, or a camera, and may be disposed on a front portion, a rear portion, a side portion, and a roof of the vehicle.

To be more specific, air filtered through an air filter 4 provided in the vehicle is introduced into a compressor 6. The air compressed by the compressor 6 is sprayed onto the surface of the environmental sensor 2 to remove the foreign substance on the environmental sensor 2. The environmental sensor 2 includes a plurality of environmental sensors 2a, 2b, and 2c. Although three environmental sensors are illustrated in the drawings and the specification, the number is not limited thereto.

Further, the air cleaning system 1 includes an air tank 8. The air tank 8 may be filled with air compressed through the compressor 6 or with air from an external device. The air filled in the air tank 8 may be used to clean the environmental sensor 2.

A controller 10 of the air cleaning system 1 is configured to operate a valve 12, such as a solenoid valve, at a preset period or in a preset situation such as, for example, when the environmental sensor 2 detects contamination. Thus, the compressed air is dispensed, directed, discharged, or sprayed from the compressor 6 or the air tank 8 to each environmental sensor 2, and cleaning of the environmental sensor 2 is thereby performed. A distributor 14 is provided or integrally formed on the valve 12 to distribute the compressed air through a nozzle 16 provided for each of the environmental sensors 2.

The compressor 6 is provided with a temperature sensing part 18. The temperature of the compressor 6 detected by the temperature sensing part 18 is transmitted to the controller 10 of the air cleaning system 1. The controller 10 is configured to monitor the temperature of the compressor 6 and thereby prevent the compressor 6 from being operated beyond an operating limit temperature. If the compressor 6 reaches the operating limit temperature, the controller 10 may control to stop operating the compressor 6 until the temperature of the compressor 6 drops.

Figure 2:
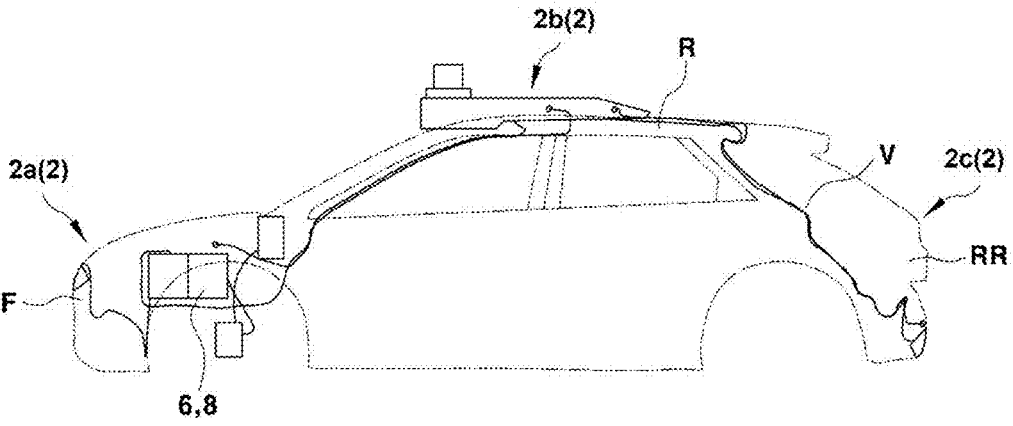
FIG. 2 is a diagram illustrating a schematic arrangement of the air cleaning system in a vehicle.

Referring to FIG. 2, the compressor 6 and the air tank 8 may be generally provided on the front portion of the vehicle. The air should be supplied from the compressor 6 and the air tank 8 provided on the front portion of the vehicle to the environmental sensors 2a, 2b, and 2c disposed on the front F, side, roof R, and rear RR of the vehicle. In this case, air stored at high pressure in the air tank 8 undergoes a rapid pressure drop in the air tank 8 and the distributor 14 and passes through a hose with a small diameter and a very long length. The air that has undergone the rapid pressure drop may easily reach a dew point to be liquefied, or water molecules in the humid air may freeze.

The hose may be clogged due to the freezing of dew condensation formed on the inner surface of the hose. Additionally, clogging may occur due to the freezing of water drops at the end of the nozzle 16. Further, at the pressure drop point of the air tank 8 and the distributor 14, clogging may occur due to the rapid sublimation of air and the freezing of moisture. This may make it impossible to clean the sensor, make it difficult to perform autonomous driving due to the contamination of the environmental sensor, and/or cause an accident in severe cases.

In particular, because parts, such as the nozzle or the hose, are unable to diagnose their own faults and may not be fail-safe when the parts are clogged due to freezing, the system is immediately stopped, making autonomous driving impossible. Further, in the case of the air tank, an aluminum material is often used for light weight and high pressure resistance. In this case, when the temperature drops, due to a sudden pressure drop during an air jet dispersion or spray and the surface temperature of the air tank is very low, the air tank is more vulnerable to freezing.

Thus, the present disclosure is intended to provide an air cleaning system having anti-freezing and ice-removing or defrosting functions. By solving the problem of the freezing caused by sudden pressure drop, the present disclosure is intended to prevent the hose and the nozzle from being clogged due to the freezing. An accident that may occur during driving, especially during autonomous driving, may thus be prevented.

Figures 3, 4:
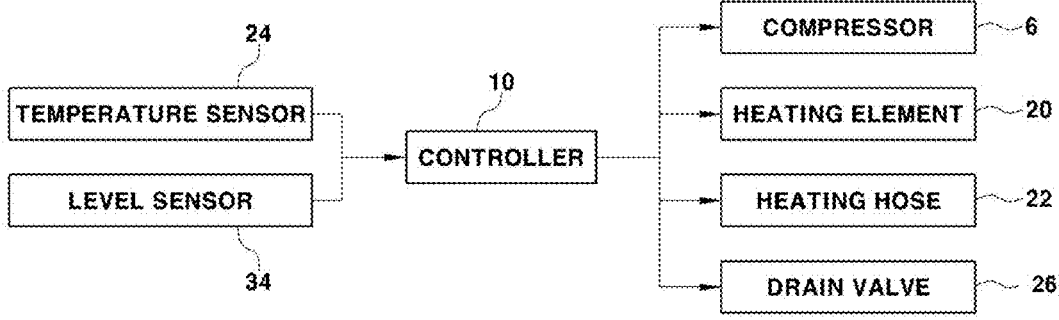
FIG. 3 is a diagram schematically illustrating a sensor cleaning system according to the present disclosure.
FIG. 4 is a diagram illustrating the configuration of a sensor cleaning system having an anti-freezing function according to the present disclosure.

As shown in FIGS. 3 and 4, the air cleaning system 1 according to the present disclosure includes a heating element 20. In an embodiment, the heating element 20 is disposed on the distributor 14. As described above, the distributor 14 may be formed integrally with the valve 12. The heating element 20 may generate heat by voltage applied thereto, thus preventing the formation of dew condensation and the freezing in the distributor 14.

Figure 5:
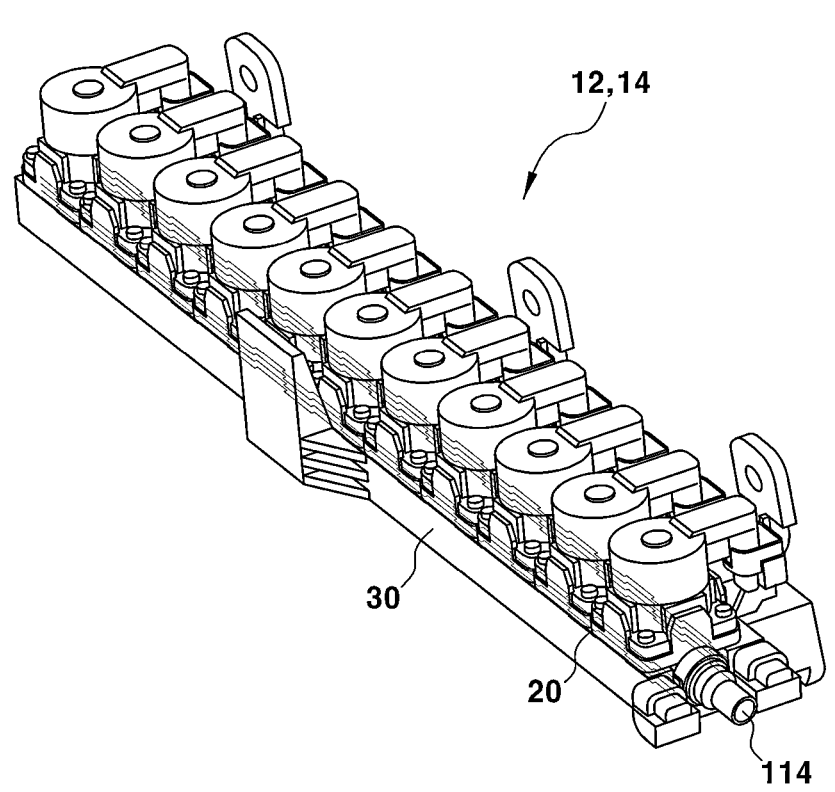
FIG. 5 is a diagram illustrating a valve and a distributor according to some embodiments of the present disclosure.
Figure 6:
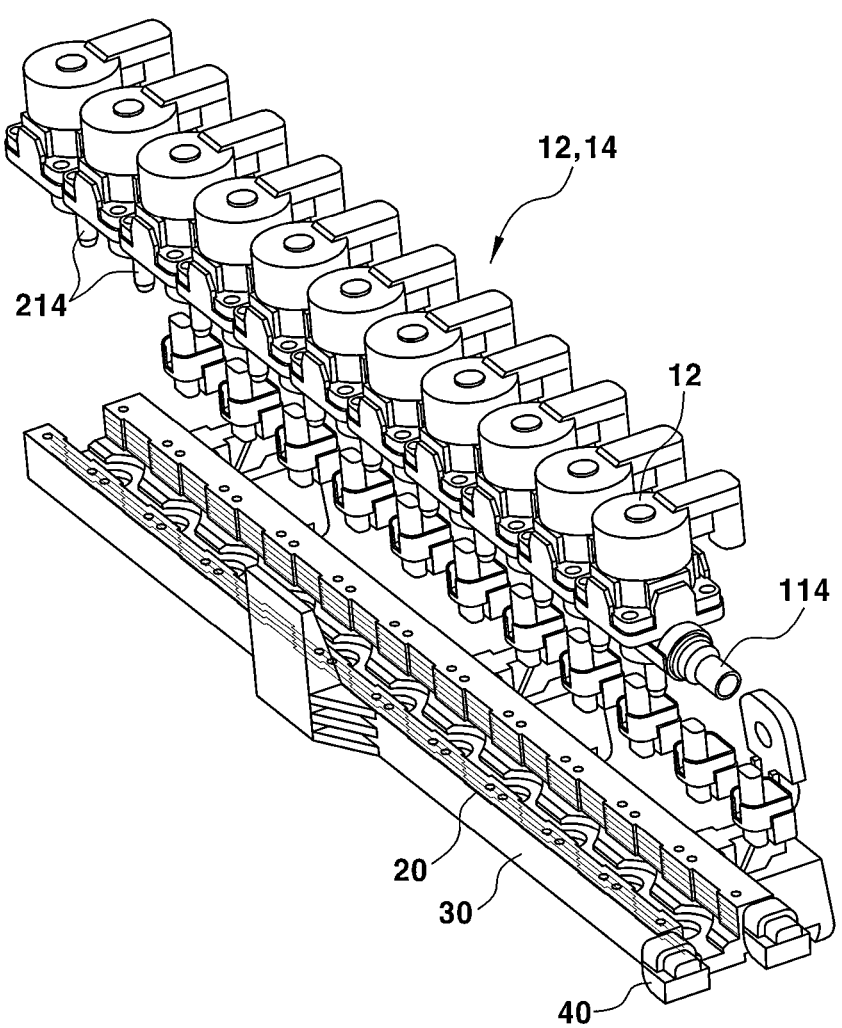
FIG. 6 is an exploded perspective view of the valve and distributor of FIG. 5.
Figure 7:
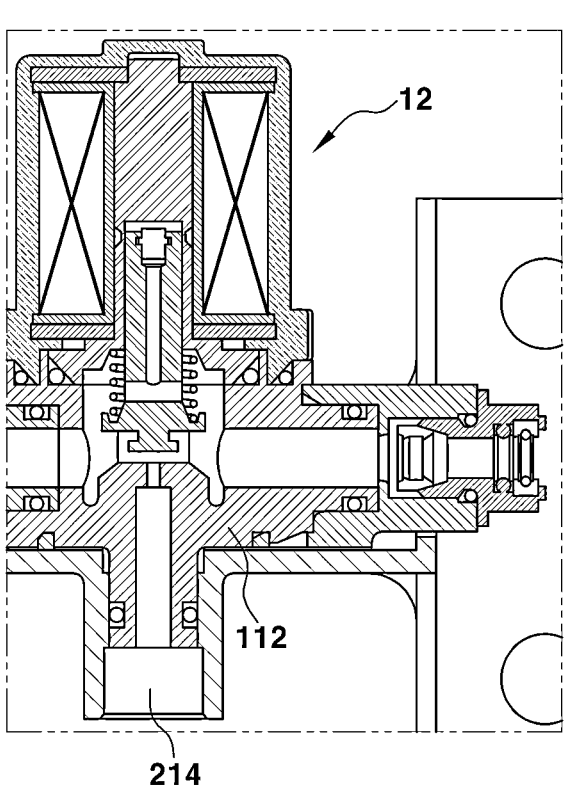
FIG. 7 is a cut-away sectional view of a valve portion of FIG. 5.

Referring to FIGS. 5 and 6, according to some embodiments of the present disclosure, the heating element 20 is mounted on the distributor 14 to surround the distributor 14. As shown in FIG. 7, in an embodiment, the heating element 20 may be disposed to surround the outside of a channel 112 of the valve 12 integrated with the distributor 14. In an embodiment, the heating element 20 may be provided on a bracket 30 for mounting the distributor 14 at a mounting position. Particularly, the heating element 20 may be disposed on the bracket 30 to surround an exit 214 of the distributor 14 or the outside of the channel 112. The heating element 20 may extend in a longitudinal direction of the bracket 30. One or two heating element(s) 20 may be provided to surround all the exits 214 of the distributor 14.

The heating element 20 is provided with a connector 40 to be connected to a power supply line, a controller 10, and the like. The connector 40 may be oriented so that assembly or attachment and detachment are easy. The heating element 20 is configured such that a path may be changed along the surface of the bracket 30. Reference numeral 114 denotes an entrance of the distributor 14 into which air is introduced from the air tank 8.

Figure 8:
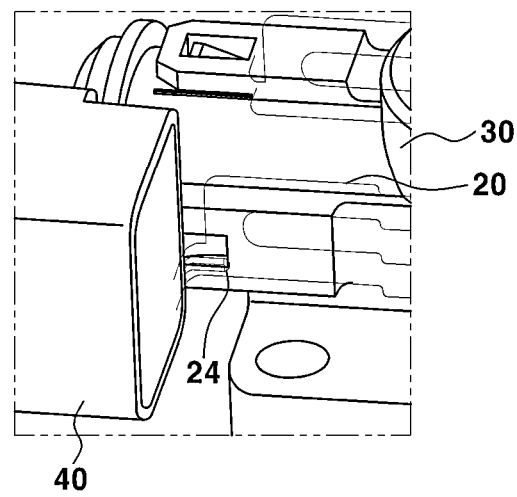
FIG. 8 is a diagram illustrating a temperature sensor provided on a valve and a distributor according to the present disclosure.
Figure 9:
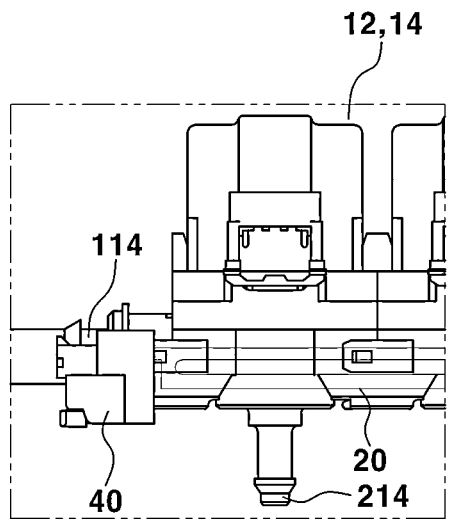
FIG. 9 is a partial side view of the valve and distributor of FIG. 5.

As shown in FIGS. 8 and 9, the distributor 14 includes a temperature sensor 24. The temperature sensor 24 may be provided around the connector 40 and may detect the temperature around the exit 214 of the distributor 14 or the channel 112. The measured value of the temperature sensor 24 may be a basis for determining the operation of the heating element 20.

Figure 10:
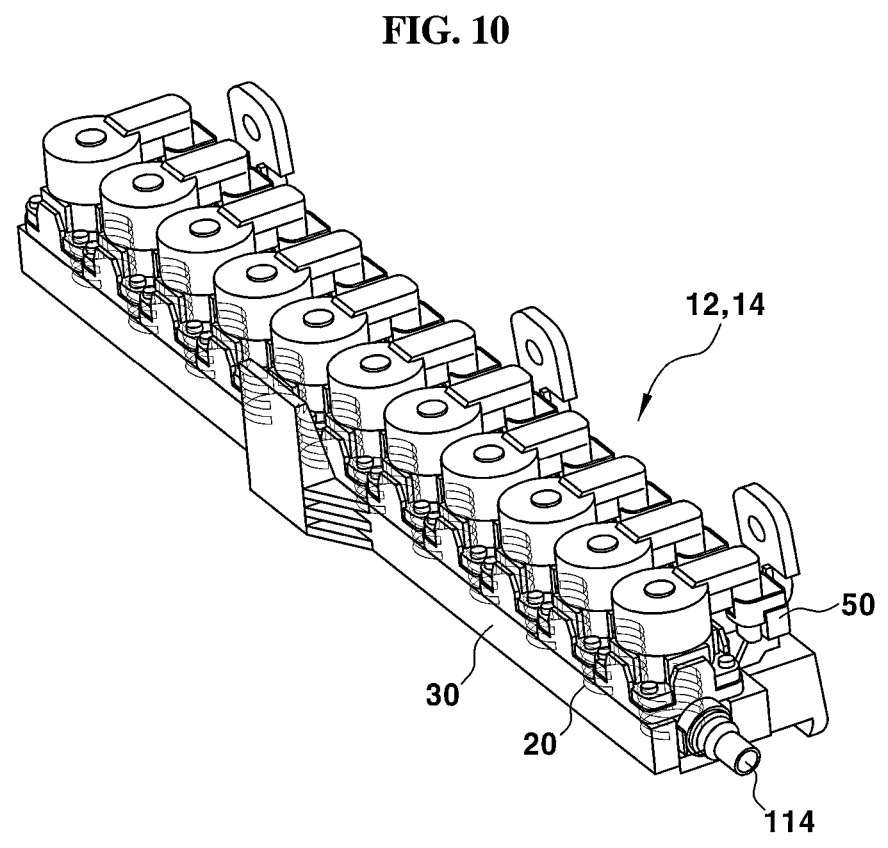
Figure 11:
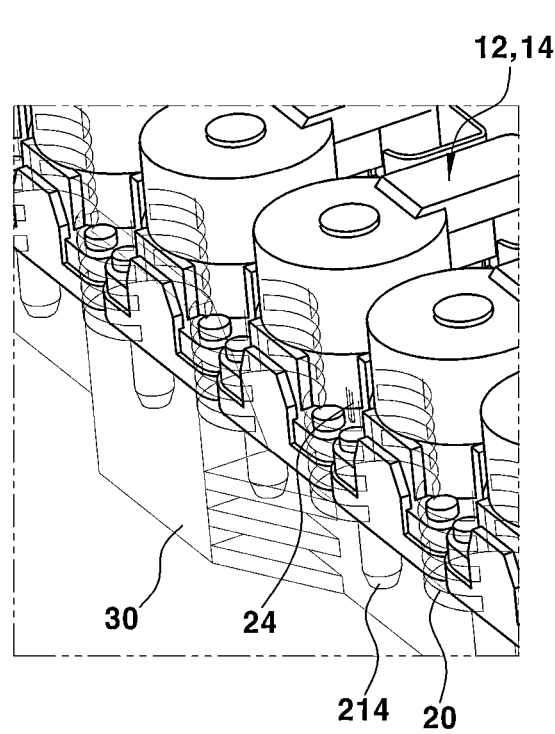
FIG. 11 is a partial enlarged view of the valve and distributor of FIG. 10.
Figure 12:
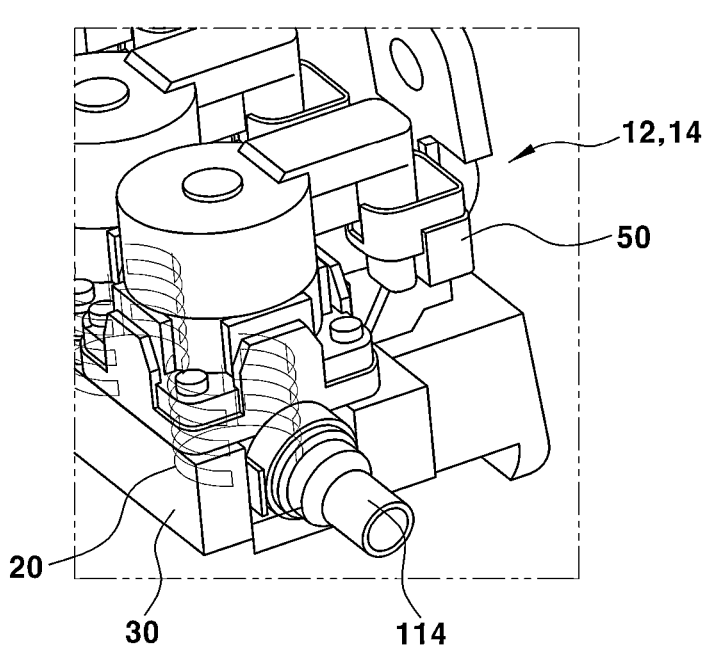
FIG. 12 is a partial enlarged view of the valve and distributor of FIG. 10.

As shown in FIGS. 10-12, according to some embodiments of the present disclosure, the heating element 20 may be configured to surround each exit 214 of the distributor 14 or the channel 112 of each valve 12. In other words, a plurality of heating elements 20 may be provided on the distributor 14. The power supply to the heating element 20 and the connection to the controller 10 may be integrally implemented by the connector 50 that controls the operation of the valve 12. Alternatively, a separate connector may be provided for the heating element 20 only. The temperature sensor 24 may be provided around the exit 214 of the distributor 14 or the channel 112 of the valve 12 to detect temperature.

According to some embodiments of the present disclosure, the heating element 20 may be disposed on the air tank 8 and may be disposed around each of an inlet and an outlet of the air tank 8. The heating element 20 may generate heat by the applied voltage, thereby preventing the formation of dew condensation and freezing of the air tank 8, in particular, at the inlet and outlet of the air tank 8. According to some embodiments of the present disclosure, the air tank 8 is provided with a drain valve 26 to discharge water generated in the air tank 8. In some embodiments, a water level sensor 34 may be provided to measure the level of water generated in the air tank 8.

As a non-limiting example, the heating element 20 may be a heat pad. Non-woven fabric and nichrome wire may be applied to the outer shell and heating wire of the heat pad. Further, the present disclosure is not limited to these materials and other possible known materials may be used. However, materials with sufficient vibration resistance and heat resistance are selected. According to the present disclosure, various types of heating elements 20 may be applied. As one non-limiting example, the heating element 20 may be a linear heating element. The linear heating element is a heating element of a series structure using nickel, iron-chromium wire, etc. As another non-limiting example, the heating element 20 may be a planar heating element. For example, as the planar heating element, an Indium Tin Oxide (ITO) film, a metal mesh film, a transparent planar heating element film, a Positive Temperature Coefficient (PTC) heating film, a far-infrared heating film, etc. may be applied. However, the present disclosure is not limited thereto, and an applicable heating element that is known to those of ordinary skill in the art may be used.

Turning back to FIG. 3, the air cleaning system 1 may further include a heating hose 22. The air passage of the air cleaning system 1 may be formed with the heating hose 22. The heating hose 22 may also be operated by the applied voltage like the heating element 20. Since an air hose usually has a very small diameter and a long length, the air hose may be easily frozen due to a pressure drop caused by the atmospheric pressure discharge of high-pressure air and a very low outdoor temperature. Accordingly, according to the present disclosure, the air passage is formed with the heating hose 22, thus increasing the air temperature when the air flows and preventing freezing.

The controller 10 receives a temperature sensed by the temperature sensor 24. Further, the controller 10 is configured to operate the heating element 20 and the heating hose 22 based on the measured temperature. When a voltage is applied to the heating element 20 and the heating hose 22 according to the determination of whether heating is required by the controller 10, heat is generated according to the physical properties of the heating wire.

Referring to FIGS. 13A-15B, a method of controlling an air cleaning system having an anti-freezing function according to the present disclosure is described.

Figure 13A:
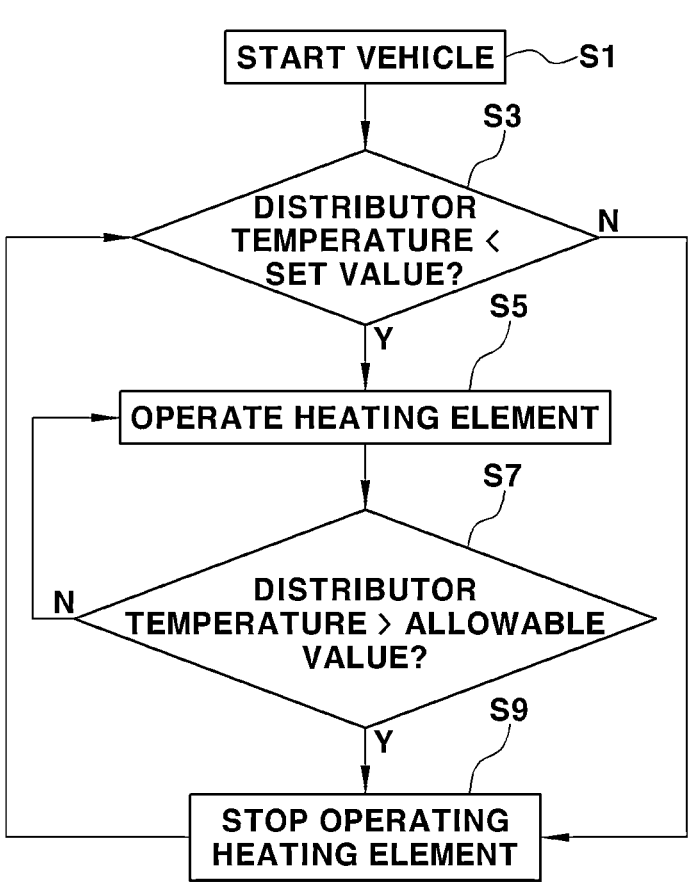
FIGS. 13A-15B are control flowcharts illustrating sensor cleaning systems according to various embodiments of the present disclosure.

As shown in FIG. 13A, the controller 10 receives an input that the vehicle is turned on (S1). When the vehicle is started, the temperature sensor 24 continuously senses the temperature of the distributor 14, and the controller 10 collects the temperature of the distributor 14 from the temperature sensor 24. The controller 10 determines whether the collected temperature of the distributor 14 is less than a preset set value (S3). Here, the set value may be 0° C., but may be changed depending on the situation. If it is determined that the temperature of the distributor 14 is less than the set value, the controller 10 operates the heating element 20 (S5). Here, the operation of the heating element 20 may also include the operation of the heating hose 22. Hereinafter, for the sake of simplicity, operation of the heating element 20 and heating hose 22 will be referred to as operation of the heating element 20. Thus, due to the operation of the heating element 20 and the heating hose 22, the temperature of the distributor 14 may be increased to prevent freezing or perform thawing. While the heating element 20 is operating, the controller 10 continuously receives temperature information from the temperature sensor 24 to determine whether the temperature of the distributor 14 reaches a preset allowable value (S7). If the temperature of the distributor 14 is higher than the allowable value, the controller 10 stops applying the voltage to the heating element 20, thus stopping the operation of the heating element 20 (S9). As a non-limiting example, the allowable value may be 10° C. However, this allowable value may be changed according to use.

Figure 13B:
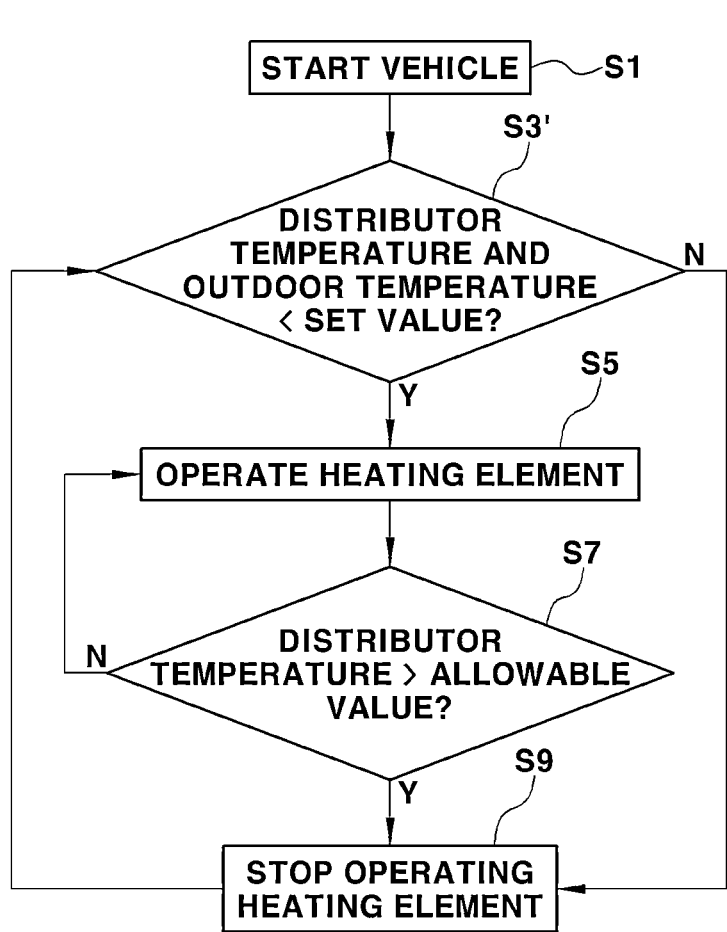
Figure 13C:
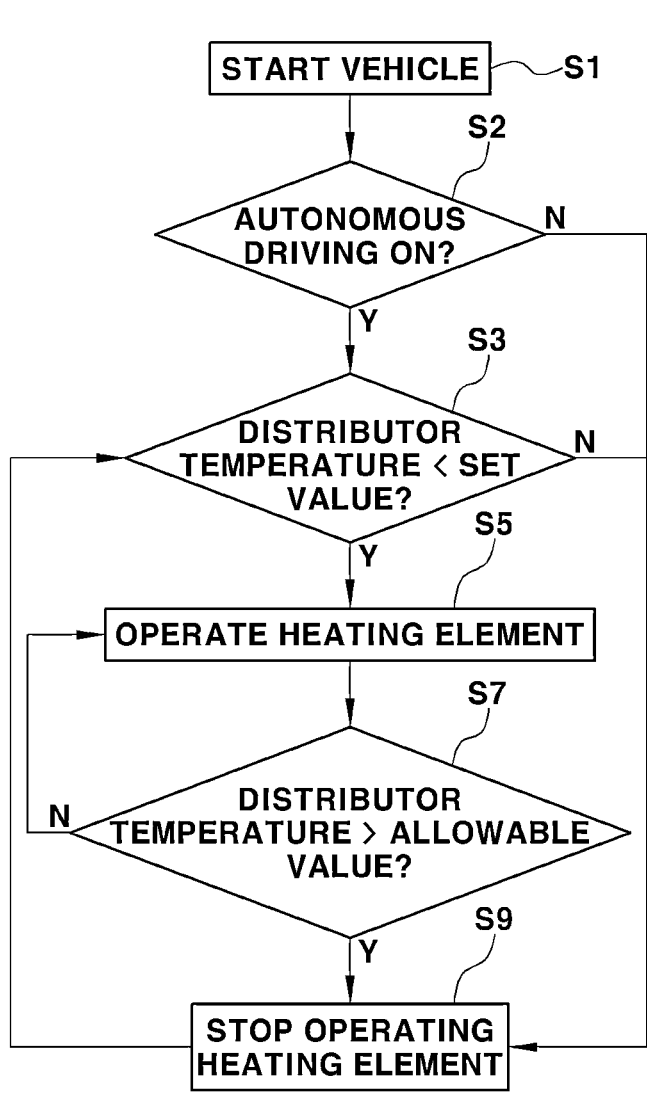

According to the present disclosure, the basis for determining the operation of the heating element 20 may be changed to reduce power consumption and increase system durability. According to some embodiments, as shown in FIG. 13B, the controller 10 may also use information about the outdoor temperature as the basis for determining the operation of the heating element 20 (S3'). When the temperature of the distributor 14 and the outdoor temperature are less than the set value, the controller 10 may operate the heating element 20. Further, as shown in FIG. 13C, according to some embodiments of the present disclosure, the controller 10 may determine the presence of the autonomous driving function of the vehicle as the basis for determining the operation of the heating element 20. The controller 10 determines whether an autonomous driving mode is turned on so that the heating element 20 operates only in the autonomous driving mode where sensor cleaning is required (S2). Further, it is possible to determine whether the heating element 20 is operated based on the temperature of the distributor 14. Since the following steps are the same as those of FIG. 13A, a duplicate description thereof has been omitted.

Figure 14:
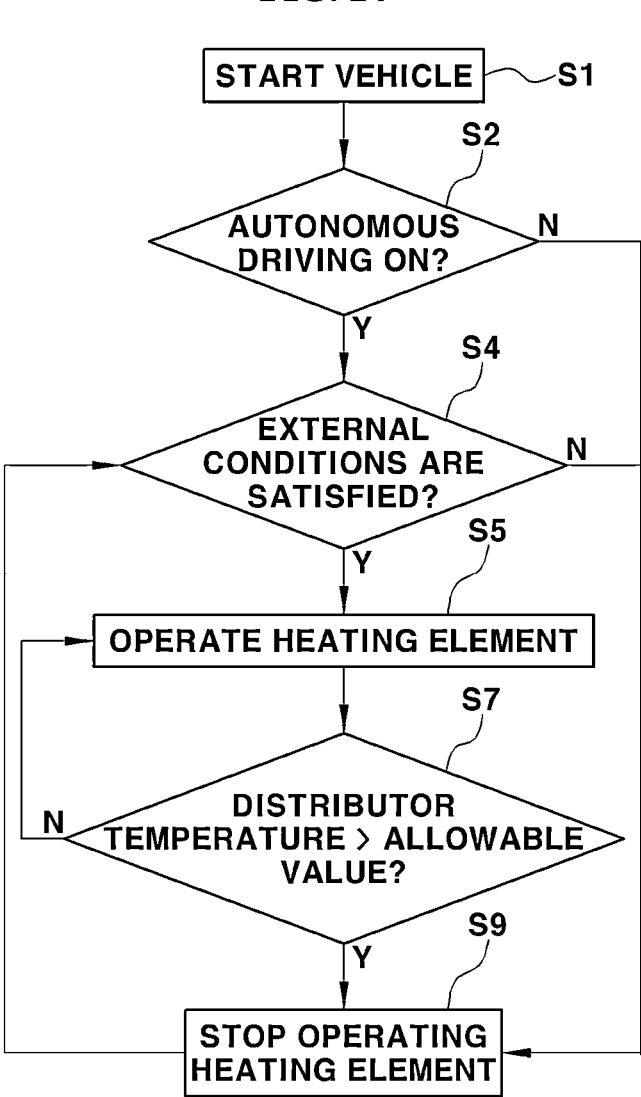

As shown in FIG. 14, according to some embodiments of the present disclosure, the controller 10 may determine the operation of the heating element 20 on the basis of external conditions, i.e., the operating conditions of other systems in the vehicle, without determining whether the temperature of the distributor 14 measured by the temperature sensor 24 is less than the allowable value (S4). For example, when driving a specific thawing system so as to prevent failure due to the freezing on other controllers in the vehicle, the controller 10 may determine the execution of the heating element 20 in response to the signal from the other controller. To this end, the controller 10 may be configured to communicate with the controller of another system for performing thawing in the vehicle.

Figure 15A:
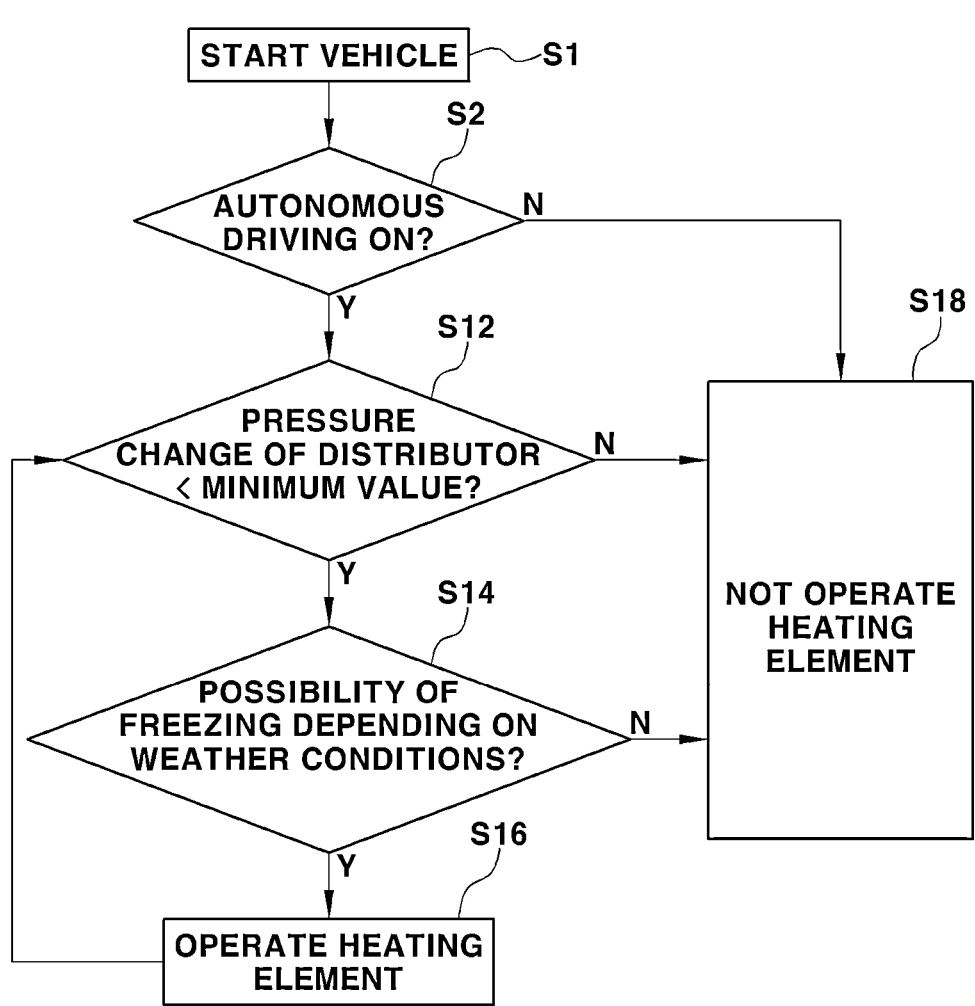

According to some embodiments of the present disclosure, the air cleaning system 1 may determine the failure of the air cleaning system 1 due to the freezing, and then correct the failure. As shown in FIG. 15A, if the vehicle is turned on (S1), the controller 10 determines whether the autonomous driving mode is turned on or not (S2). When the autonomous driving mode is turned on (Y in S2) and the controller 10 opens the valve 12 to clean the sensor, the controller 10 observes a change in pressure of the distributor 14. The controller 10 determines whether the change in pressure of the distributor 14 is less than a preset minimum value (S12). If there is no or little change in pressure of the distributor 14 (Y in S12) even when an open command is transmitted to the valve 12, clogging caused by freezing may be predicted. In this case, the controller 10 determines that the clogging caused by the freezing has occurred and operates the heating element 20 to perform thawing.

In addition, the controller 10 may determine the possibility of freezing according to the weather conditions (S14). For example, the controller 10 may collect information about rainfall and information about outdoor temperature to determine or predict clogging caused by freezing (Y in S14) with a higher probability when there is no rainfall and the outdoor temperature is below zero. In other words, even when the open command is transmitted to the valve 12 but the change in pressure of the distributor 14 is less than the minimum value and there is a possibility of freezing due to weather conditions, the controller 10 may operate the heating element 20 (S16). The air cleaning system may determine not to operate the heating element 20 (S18) when autonomous driving is turned off (N in S2), when there is a pressure change above the preset minimum value (N in S12), and when there is no probability of freezing (N in S14).

As shown in FIG. 15B, according to some embodiments of the present disclosure, the controller 10 may use information from another controller as the basis for determining whether freezing occurs or not. When the autonomous driving mode is turned on (Y in S2), the controller 10 receives a sensor cleaning attempt failure (N in S13) from an autonomous driving controller of the autonomous driving system (S13). For example, there may be a case in which the cleaning command is transmitted from the autonomous driving controller to the controller 10 of the sensor cleaning system, but the sensor cleaning is not performed (N in S13) due to clogging caused by freezing. The autonomous driving controller may notify the controller 10 that cleaning has failed despite several sensor cleaning execution commands, and the controller 10 may determine that the air cleaning system 1 is frozen based on this information. Additionally, the controller 10 may operate the heating element 20 (S19) to solve the freezing when there is a possibility of freezing according to the weather conditions (when there is no rainfall and the outdoor temperature is below zero) (Y in S15), and when the pressure change of the distributor 14 is also less than the minimum value (Y in S17). The air cleaning system may determine not to operate the heating element 20 (S21) when autonomous driving is turned off (N in S2), when there is a pressure change above the preset minimum value (N in S17), when there is no probability of freezing (N in S15), and when the sensor cleaning has been completed or successfully performed (Y in S13).

According to the present disclosure, failure of the air cleaning system can be prevented.

The air cleaning system according to the present disclosure can be implemented using additional components and/or with a change of some components and a control logic without a great change in the package, the sensor cleaning system components.

The air cleaning system according to the present disclosure can diagnose a failure caused by freezing and solve the freezing problem, for example, by thawing the frozen material.

Although the present disclosure has been described with reference to specific embodiments shown in the drawings, it should be apparent to those of ordinary in the art that the present disclosure may be changed and modified in various ways without departing from the scope of the present inventive concept, which is described in the following claims.

What is claimed is:

1. A sensor cleaning system for a vehicle, the system comprising:

a distributor having a channel into which compressed air is introduced and having a plurality of exits, the distributor configured to distribute the compressed air from the channel to each exit of the plurality of exits;

a plurality of valves formed integrally with the distributor, each valve capable of being selectively opened or closed to allow or prevent a supply of the compressed air through a respective one of each of the plurality of exits;

a heating element configured to apply heat to the distributor and disposed to surround the distributor;

a controller configured to operate the heating element based on a determination that a preset condition is satisfied; and a temperature sensor disposed on the distributor configured to detect a temperature of the distributor and to transmit the detected temperature to the controller, wherein the controller is configured to operate the heating element based on a determination that a change in pressure of the distributor is less than a preset minimum value at the time of one of the plurality of valves being opened.

2. The system of claim 1, wherein the controller is configured to operate the heating element based on the temperature of the distributor received from the temperature sensor.

3. The system of claim 1, further comprising:

a bracket on which the distributor is mounted, the heating element being positioned between the distributor and the bracket.

4. The system of claim 1, wherein the heating element is disposed on the distributor to surround an outside of the channel.

5. The system of claim 1, wherein the heating element is provided for each of the plurality of exits.

6. The system of claim 1, wherein the controller is configured to:

receive a temperature of the distributor from the temperature sensor; and operate the heating element based on a determination that the temperature of the distributor is less than a preset value.

7. The system of claim 6, wherein the controller is configured to:

continuously receive the temperature of the distributor from the temperature sensor after the heating element is operated; and stop operating the heating element based on a determination that the temperature of the distributor exceeds a preset allowable value.

8. The system of claim 6, wherein the controller is configured to:

operate the heating element based on a determination that the temperature of the distributor and an outdoor temperature are less than a set value.

9. The system of claim 1, wherein the controller is configured to only operate the heating element based on a determination that an outdoor temperature and a rainfall satisfy preset conditions.

10. The system of claim 1, wherein the controller is configured to:

determine whether an autonomous driving mode of a vehicle is turned on; and operate the heating element, based on a determination that the autonomous driving mode of the vehicle is turned on and the temperature received from the temperature sensor is less than a set value.

11. The system of claim 1, wherein the controller is configured to control an operation of the plurality of valves.

12. The system of claim 11, further comprising:

a heating hose configured so that compressed air discharged from the exit flows to a target nozzle and configured to generate heat.

13. The system of claim 12, wherein the controller is configured to operate the heating element based on a determination that the compressed air is not discharged by the target nozzle at the time of the valve being opened.

* * * * *